United States Patent
Rouquette et al.

(10) Patent No.: US 8,120,507 B2
(45) Date of Patent: Feb. 21, 2012

(54) TWO-TIER STREAMER COMMUNICATION SYSTEM

(75) Inventors: Robert E. Rouquette, Covington, LA (US); Clem B. Guillot, III, Thibodaux, LA (US); Robert H. Kemp, Jr., Harahan, LA (US); Dale J. Lambert, Mandeville, LA (US); Daniel B. Seale, New Orleans, LA (US)

(73) Assignee: Ion Geophysical Corporation, Houston, TX (US)

( * ) Notice: Subject to any disclaimer, the term of this patent is extended or adjusted under 35 U.S.C. 154(b) by 449 days.

(21) Appl. No.: 12/410,578

(22) Filed: Mar. 25, 2009

(65) Prior Publication Data

US 2010/0245119 A1  Sep. 30, 2010

(51) Int. Cl.
*H04L 25/20* (2006.01)
*H04L 5/14* (2006.01)
*H04B 13/02* (2006.01)

(52) U.S. Cl. ............... 340/850; 340/870.18; 340/870.26
(58) Field of Classification Search ............... 340/854.9, 340/870.18, 870.26, 850; 367/76, 870.18, 367/870.26
See application file for complete search history.

(56) References Cited

U.S. PATENT DOCUMENTS

| | | |
|---|---|---|
| 4,092,629 A | 5/1978 | Siems et al. |
| 4,319,347 A | 3/1982 | Savit |
| 4,375,089 A | 2/1983 | Thigpen et al. |
| 4,967,400 A | 10/1990 | Woods |
| 5,058,080 A | 10/1991 | Siems et al. |
| 5,200,930 A | 4/1993 | Rouquette |
| 5,206,835 A | 4/1993 | Beauducel |
| 5,400,298 A | 3/1995 | Hepp |
| 5,627,798 A | 5/1997 | Siems et al. |
| 6,011,753 A | 1/2000 | Chien |
| 7,061,829 B2 | 6/2006 | Scott |
| 7,167,589 B2 | 2/2007 | Rouquette |
| 7,176,589 B2 | 2/2007 | Rouquette |

OTHER PUBLICATIONS

ION Geophysical Corporation data sheet, "MSX Streamer Repeater Module CRX," copyright 2007, ION Geophysical Corporation, Stafford, Texas, USA.
ISA/EP, International Search Report and Written Opinion of the International Searching Authority PCT/US10/28142, Jun. 4, 2010, European Patent Office, Rijswijk, NL.

*Primary Examiner* — Giovanna Wright
(74) *Attorney, Agent, or Firm* — James T. Cronvich

(57) ABSTRACT

A two-tier communication system for a seismic streamer. The communication system operates over an unshielded twisted-pair communication line extending the length of the streamer. Repeater units having a repeater function and a device controller function divide the twisted pair into line segments. Coils on each segment couple signals inductively to collocated external devices in a low-speed 2400 baud FSK data link between the devices and an associated device controller. A Gaussian 8-level FSK high-speed 60 kbit/s data link is established along all the segments with the repeaters re-transmitting boosted signals along the entire length of the communication line. The coils are transparent at the high-speed data rate. Time division multiple access (TDMA) or frequency division multiple access (FDMA) is used to accommodate the two links on the single twisted pair.

15 Claims, 3 Drawing Sheets

TWO-TIER STREAMER COMMUNICATION SYSTEM

BACKGROUND

The invention relates to communication systems generally and, more particularly, to communication systems and methods for communicating with positioning and sensing devices connected to underwater hydrophone cables.

Conventional hydrophone cables, such as streamers towed behind survey vessels, are equipped with positioning and sensing devices, such as cable-leveling or -steering birds, acoustic transceivers, and heading sensors. The devices may be mounted external to the streamer or in-line with it. An unshielded twisted-pair line runs the length of each streamer. Communication coils connected at spaced apart locations along the length of the twisted-pair line inductively couple commands, control, and data signals between the communication line and the devices. A controller aboard the survey vessel towing the streamers transmits messages to and receives data from the devices over the twisted-pair line. In conventional systems, the twisted-pair communications operates at 2400 baud (with 1 bit per symbol) half-duplex with frequency-shift-keying (FSK) modulation at a center frequency of 26 kHz.

As longer and longer streamers with more and more devices are placed into service, the 2400-baud communication system becomes a factor limiting further expansion. First, the signals attenuate along the length of the streamer and, consequently, limit the useful length of the streamer. Repeaters that boost the signals along the length of the streamer have been deployed to solve the problem of signal attenuation. But, even with repeaters, the increased number of devices means more time required for communications and, at 2400 baud, the communications bandwidth is limited.

Thus, there is a need for a communication system that supports longer streamers and more devices on existing unshielded, twisted-pair communication lines.

SUMMARY

These needs and others are addressed by a communication system embodying features of the invention for communicating with devices attached to an underwater cable. The communication system operates over a twisted-pair communication line disposed along the length of an underwater cable, such as a hydrophone streamer. Repeater units are disposed at spaced apart locations along the length of the cable. The repeater units, which are connected in series into the communication line, divide it into segments between consecutive repeater units. Communication coils are connected across the communication line in the segments for communicating inductively with devices attached to the cable. A high-speed data link operates through the repeater units at a first data rate over the entire length of the communication line during a first time window or on a first channel. Low-speed data links each operate at a second data rate lower than the first data rate on one of the segments between repeater units during a second time window different from the first time window or on a different second channel to send data to and receive data from devices.

Another aspect of the invention provides a method for communicating over a twisted-pair streamer communication line with devices inductively coupled to the line by coils at spaced apart positions along the streamer. The method comprises: (a) dividing the communication line into segments by interposing repeater units in series with consecutive segments; (b) operating a high-speed data link over all the segments at a first data rate during a first time window or on a first channel to communicate with each of the repeater units; (c) operating a low-speed data link at a lower second data rate during a different second time window or on a different second channel over each segment between one of the repeater units connected to the segment and the devices coupled to the coils on that segment.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
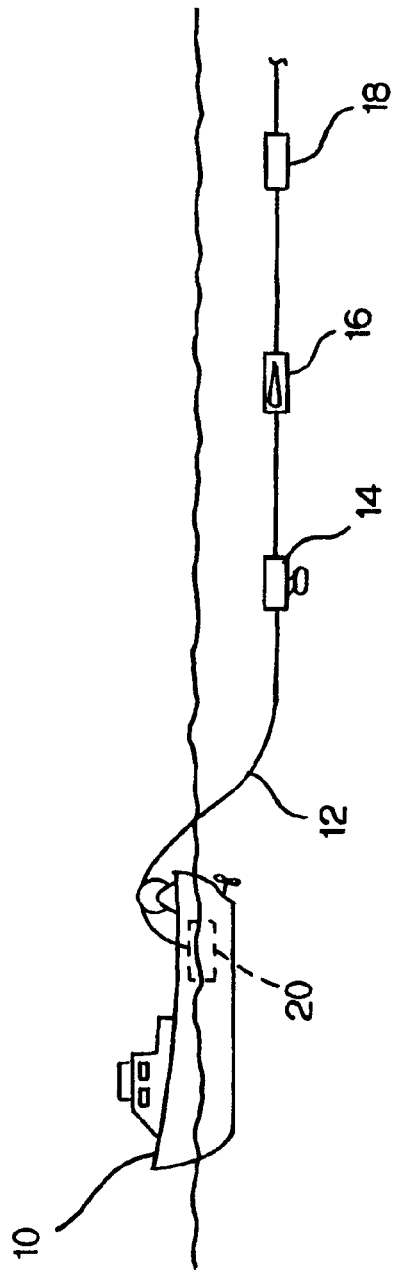
FIG. 1 is a pictorial view of a survey vessel towing a seismic streamer having external devices communicating over a communication system embodying features of the invention.

FIG. 1 depicts a survey vessel 10, a ship, towing a seismic streamer 12 housing hydrophones along its length. External devices, such as hydroacoustic transceivers 14, cable-leveling birds 16, and heading sensors 18, are attached to the periphery of the underwater streamer cable at specific locations along its length. Other external devices, such as velocimeters and cable-steering birds, may be attached as well. Internal devices housed within the streamer may also be provided. In a typical 3-D survey, the ship may tow a plurality of streamers, which may be as long as 12 km. All the devices, external and internal, are controlled from a shipboard controller 20 that communicates along an unshielded, twisted-pair communication line extending the length of the streamer. (Hydrophone data is transmitted to the shipboard controller over a separate unshown communication link.)

Figure 2:
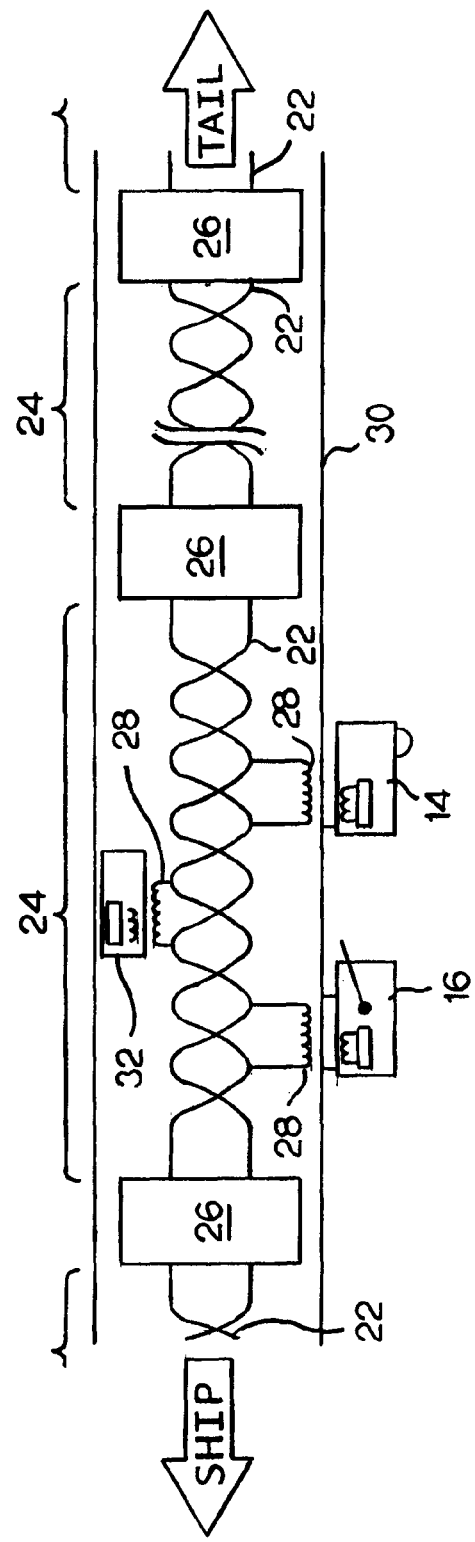
FIG. 2 is a block diagram of the physical layer of a two-tier communication system usable in a streamer as in FIG. 1.

The physical layer of the device communication system is shown in FIG. 2. The twisted-pair communication line 22 interfaces with the shipboard controller through a line-interface unit (not shown), connected to the head end of the communication line on board the ship. The twisted-pair communication line is divided into segments 24 by repeater units 26 spaced apart along the communication line. Consecutive repeater units are spaced apart no more than 4 km. The repeater units include repeaters that retransmit and boost the power of inbound (to the ship) and outbound (from the ship) data streams to ensure adequate signal levels and quality out to the tail end of the streamer.

Communication coils 28 are connected across the twisted pair at specific locations along each segment 24. Communication coils inductively couple signals between the communication line and the external devices 14, 16 that are attached to the periphery 30 of the streamer in the vicinity of an associated coil. Internal devices 32 housed within the streamer may be coupled to a coil 28 as well.

Figure 3:
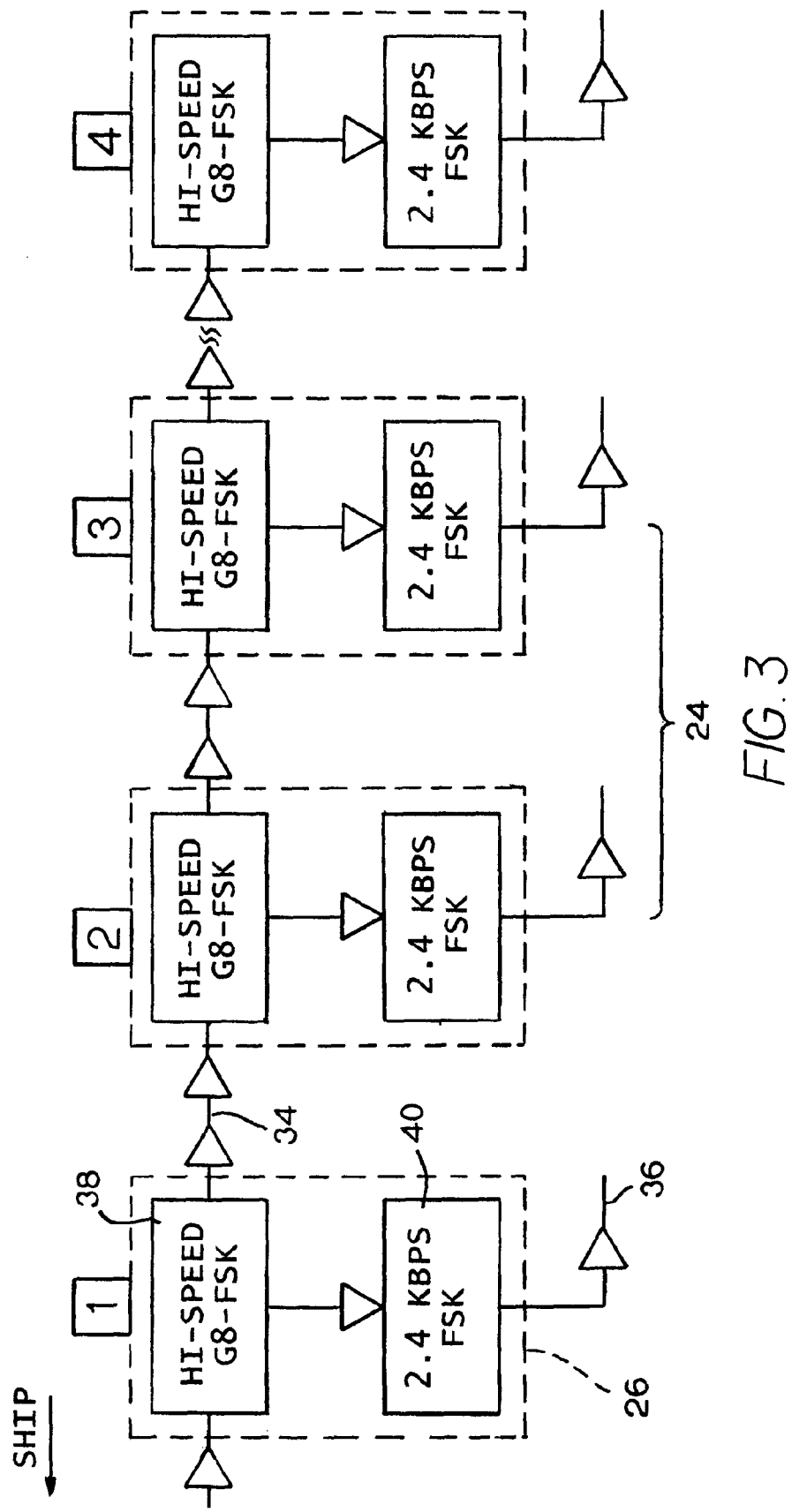
FIG. 3 is a block diagram of the logical layer of the two-tier communication system of FIG. 2.

As shown in FIG. 3, the logical layer of the communication system provides a two-tier communication system over the single twisted-pair communication line 22 depicted in FIG. 2. The communication system preferably comprises a high-speed, symmetrical, half-duplex data link having a two-tier repeater-based architecture consisting of a single high-speed backbone link 34 as a first tier and multiple low-speed short-haul links 36—one on each communication line segment 24—as a second tier. Because both the high-speed and low-speed data links operate over the same twisted pair, time division multiple access (TDMA), in which the two data links are operated during different time windows, is used to avoid collisions between messages on the two links. Alternatively, the high-speed and the low-speed data links are operated over the twisted pair on two separate channels using frequency division multiple access (FDMA). For example, the high-speed data link could operate in a first, higher-frequency channel having a center frequency of about 104 kHz, the $4^{th}$ harmonic of the lower-frequency channel center frequency, and each low-speed data link could operate in a second, lower-frequency channel having a center frequency of about 26 kHz. FDMA would permit simultaneous operation of both data links. TDMA and FDMA are two examples of communication techniques that could be used to accommodate both data links on the single communication line. The high-speed backbone preferably uses 8-level Gaussian FSK modulation 38 with the repeaters. The high-speed link operates at a data rate of 60 kbits/s (20 kbaud with 3 bits per symbol) modulating a center frequency of about 100 kHz. At this higher frequency, the communication line looks like a transmission line, and the communication coils tuned for 26 kHz are transparent. The low-speed links logically branch off at each repeater unit 26 to communicate with external and internal devices using 2400 baud FSK modulation 40 with a center frequency of about 26 kHz—the standard communication system for existing external devices. Consequently, those existing devices may be used with this two-tier communication system without modification. Each low-speed link encompasses a repeater unit and a communication-line segment 24 on the tail-end side of the repeater unit.

Figure 4:
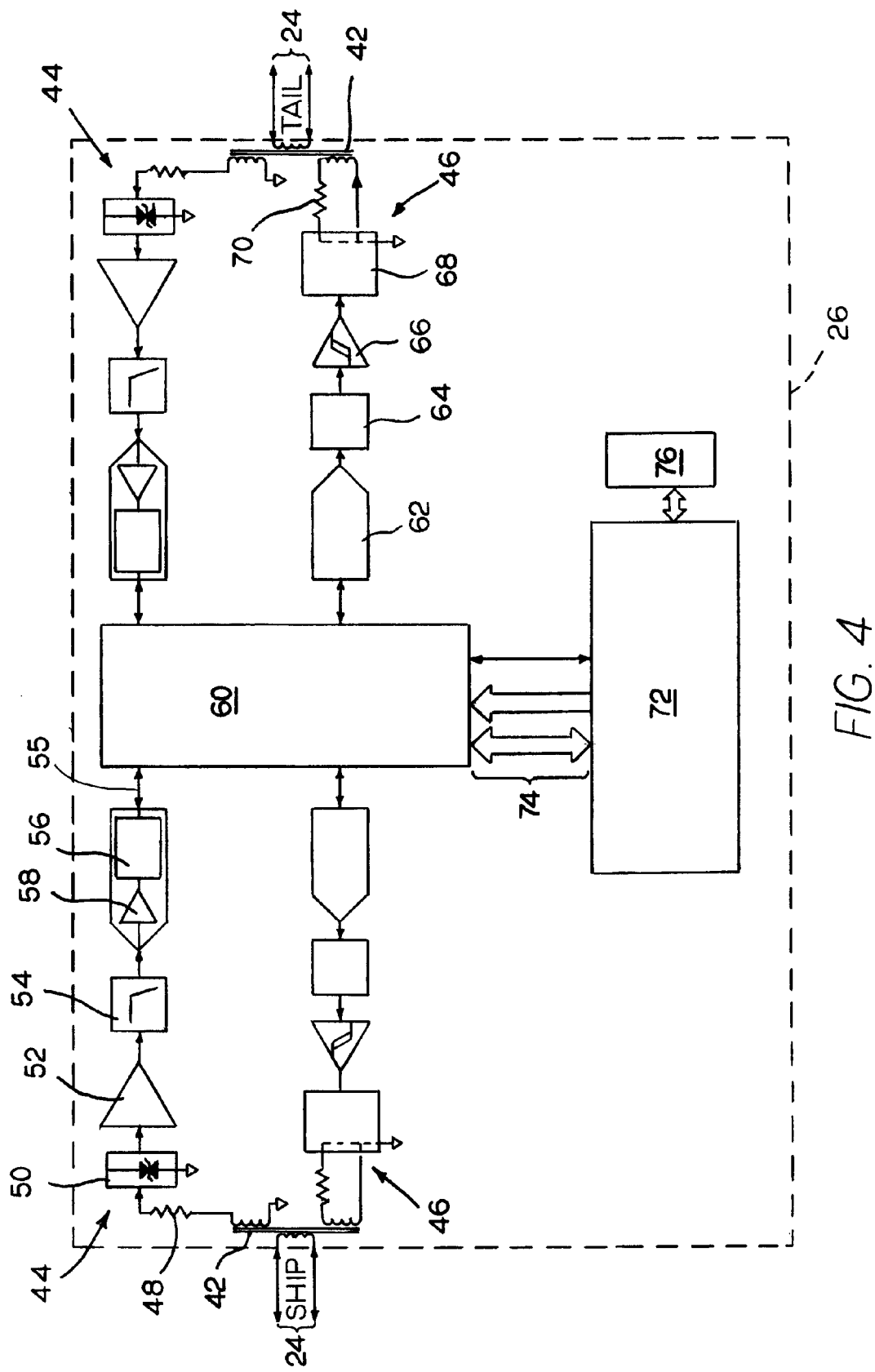
FIG. 4 is a block diagram of a repeater/controller used in the communication system of FIG. 2.

A block diagram of the repeater unit is shown in FIG. 4. Each segment 24 of the communication line is connected to the repeater unit 26 and coupled via a transformer 42 to a receiver 44 and a signal generator 46. Because the inbound and outbound receivers and signal generators are identical, only the outbound circuits are described in detail.

Outbound signals on the communication line are coupled to the receiver 44 by the transformer 42. The signals pass from the transformer secondary through an input impedance 48 and a limiter 50, which provides overvoltage protection, to a low-noise pre-amplifier 52. A low-pass, anti-aliasing filter 54 removes high-frequency noise to avoid aliasing in the digitized signal 55 produced by a 16-bit analog-to-digital converter (ADC) 56. The ADC, which is preceded by a track-and-hold sampler 58, operates at a sample rate of about 400 ksamples/s. The digitized inbound signal is then processed in a digital-signal-processor (DSP) 60.

The DSP sends digital signals to the outbound signal generator 46. The digital signals are converted to analog signals in a 16-bit digital-to-analog converter (DAC) 62 operated at about 400 kHz. A reconstruction filter 64 time interpolates the converted waveform, and a zero-crossing comparator 66 ensures an analog signal without time quantization. The signal is amplified in an H-bridge power amplifier 68, whose output is applied to the transformer 42. The receiver transmits the outbound signal on to the communication-line segment 24 through the transformer 42. Because the communication system is operated half-duplex, the output of the power amplifier is grounded and the signal-generator winding of the transformer is terminated in a load resistance 70 during data-reception time windows.

The DSP 60 implements a high-speed and a low-speed modem. The high-speed modem is implemented as part of the repeater unit's repeater function. The DSP demodulates incoming Gaussian 8-level, FSK-modulated messages (inbound or outbound) digitized in its receiver and converts them to a bit stream. The DSP frames outbound messages into bytes, buffers and sends them to a device controller 72 over control lines 74, which may include a data bus, address, and control lines. Inbound message streams are simply repeated. For messages originating in a repeater unit, the DSP prepends a fixed number of preamble bytes to the demodulated message bytes before FSK-modulating the outgoing message. The preamble is used by the next repeater unit in the repeater chain to recover the clock and synchronize the demodulation. In building outbound messages, the shipboard controller also prepends preamble bytes for the same reason. A timing recovery function implemented in the repeater unit derives the clock from the incoming message stream. To minimize the delay through each repeater, the high-speed repeaters operate at the symbol level. Higher-level message structures, such as bytes and frames, are ignored by the high-speed repeat function.

Each low-speed data link 36 is associated with one of the repeater units 26. The device controller 72, which may be a microcontroller, in each repeater unit manages the associated low-speed data link on the communication line segment 24 connected to the tail-end side of that repeater unit. The device controller relays commands and responses between the high-speed data link and the low-speed link. The low-speed half-duplex link operates asynchronously at 2400 baud. The DSP 60 acts a modem to FSK-modulate outgoing (outbound) commands from the device controller to the external devices inductively coupled to the communication-line segment and to demodulate incoming (inbound) responses.

Each device controller is addressable by the shipboard controller and includes a storage element 76 that includes a list of the devices connected to its associated communication-line segment; namely, a poll table. In a standard device scan cycle using TDMA, the shipboard controller broadcasts an Acoustic Sync command on the high-speed data link to all the repeaters during a first time window, in which the high-speed link is active. Then, during a second time window, in which the low-speed data link is active, the device controller in each repeater unit transmits the local Acoustic Sync command on its low-speed link after a pre-selected delay inversely proportional to the repeater unit's known distance from the head end of the streamer. This is to ensure simultaneous transmission of all Acoustic Sync commands on all the segments. Next, each repeater unit individually polls each of the non-acoustic devices, e.g., birds and heading sensors, in its device poll table by transmitting poll messages on its communication-line segment and waiting to receive timely responses from the devices. The device controller controls the receive and transmit states of the DSP modem, as well as the high-speed and low-speed states referenced to the Acoustic Sync command or as set by the shipboard controller. After polling the non-acoustic devices and receiving their responses, the device controller individually polls the acoustic ranging devices and receives their responses. The device controller buffers all the responses for transmission through the DSP to the shipboard controller, which polls each repeater unit for its devices' response data over the high-speed data link. The shipboard controller controls line turnaround. Each repeater, when not transmitting, is in a 'listen' state, monitoring its ship- and tail-side communication segments for incoming data.

Thus, the invention provides a two-tier communication system that operates on high-speed and multiple low-speed data links over the existing unshielded twisted-pair line and conventional streamers for reliable communication with many devices and long streamers.

What is claimed is:

1. A communication system for communicating with devices attached to an underwater cable, the system comprising:
   a two-wire communication line disposed along the length of an underwater cable;
   a plurality of repeater units disposed at spaced apart locations along the length of the underwater cable and connected in series with the two-wire communication line to divide the line into segments between consecutive repeaters;
   a plurality of communication coils connected across the two-wire communication line in the segments for communicating inductively with devices attached to the underwater cable;
   a high-speed data link operating through the repeaters at a first data rate over the entire length of the communication line;
   a plurality of low-speed data links, each operating at a second data rate lower than the first data rate on one of the segments between repeater units to send data to and receive data from the devices over the communication coils.

2. A communication system as in claim 1 wherein the two-wire communication line comprises a twisted-pair wire.

3. A communication system as in claim 1 wherein the coils are tuned to be transparent to the high-speed data link operating at the first data rate.

4. A communication system as in claim 1 wherein each of the low-speed data links is controlled by only one of the repeater units connected to the corresponding segment.

5. A communication system as in claim 4 wherein each repeater unit includes a storage element including a poll table listing all the external devices coupled to the corresponding segment.

6. A communication system as in claim 1 wherein each repeater unit includes a receiver and a signal generator coupled to each segment of the communication line connected to the repeater unit.

7. A communication system as in claim 1 wherein each repeater unit includes a digital signal processor comprising a modem on the high-speed data link coupled to each segment of the communication line connected to the repeater unit.

8. A communication system as in claim 1 wherein the high-speed data link operates at 60 kbit/s and the low-speed data links operate at 2400 baud.

9. A communication system as in claim 1 wherein the high-speed data link operates during a first time window and each of the low-speed data links operates on the associated segment during a different second time window.

10. A communication system as in claim 1 wherein the high-speed data link operates in a first channel and each of the low-speed data links operates on the associated segment in a different second channel.

11. A method for communicating over a twisted-pair streamer communication line with devices inductively coupled to the communication line by communication coils disposed at spaced apart positions along the streamer, the method comprising:
    dividing the communication line into segments by interposing repeater units in series with consecutive segments;
    operating a high-speed data link over all the segments at a first data rate to communicate with each of the repeater units;
    operating a low-speed data link at a lower second data rate over each segment between one of the repeater units connected to the segment and the devices coupled to communication coils on the segment.

12. The method of claim 11 wherein the high-speed data link is operated during a first time window and the low-speed data link is operated during a different second time window.

13. The method of claim 11 wherein the high-speed data link is operated on a first channel and the low-speed data link is operated on a different second channel.

14. The method of claim 11 further comprising storing a different poll table in each repeater unit listing all the devices coupled to the segment associated with the low-speed data link operated by the repeater unit.

15. The method of claim 11 further comprising:
    transmitting an acoustic sync command over the high-speed data link to all the repeater units; and
    subsequently transmitting a local acoustic sync command on each of the low-speed data links simultaneously.

* * * * *